May 7, 1957

J. C. McNEICE 2,791,444

HITCH ARRANGEMENT FOR TRACTORS OF THE
CONNECTION FACILITATING TYPE

Filed June 28, 1954

Inventor
James Curtis McNeice
By Carlson, Pitzner, Hubbard & Wolfe
Atty's

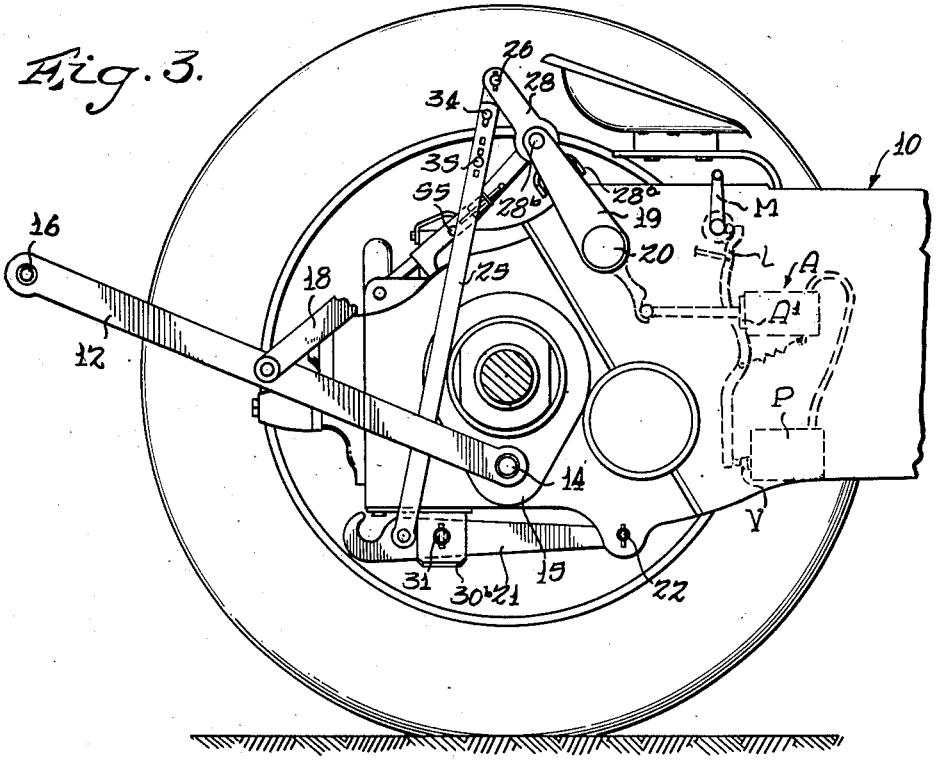
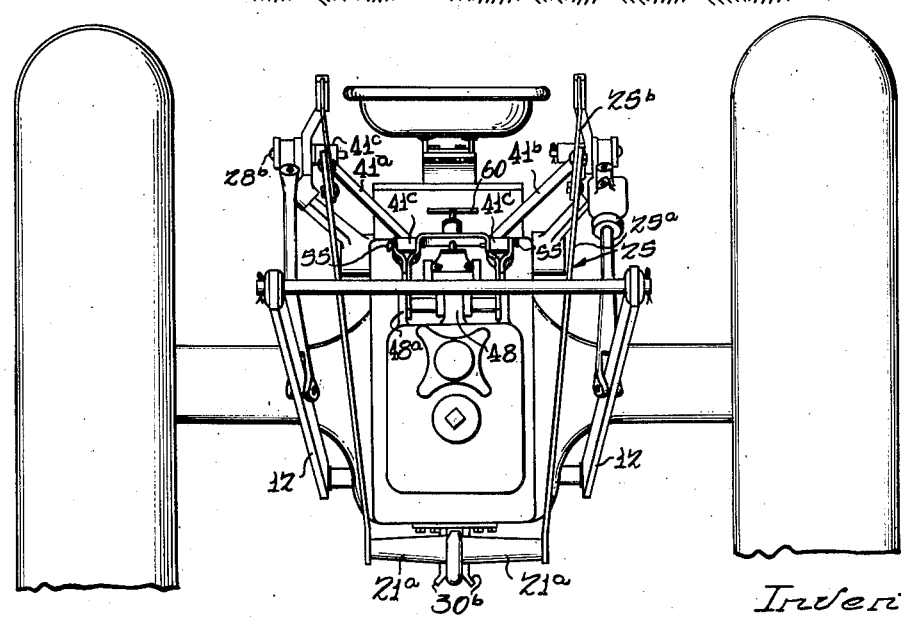

May 7, 1957 J. C. McNEICE 2,791,444
HITCH ARRANGEMENT FOR TRACTORS OF THE
CONNECTION FACILITATING TYPE
Filed June 28, 1954 3 Sheets-Sheet 3
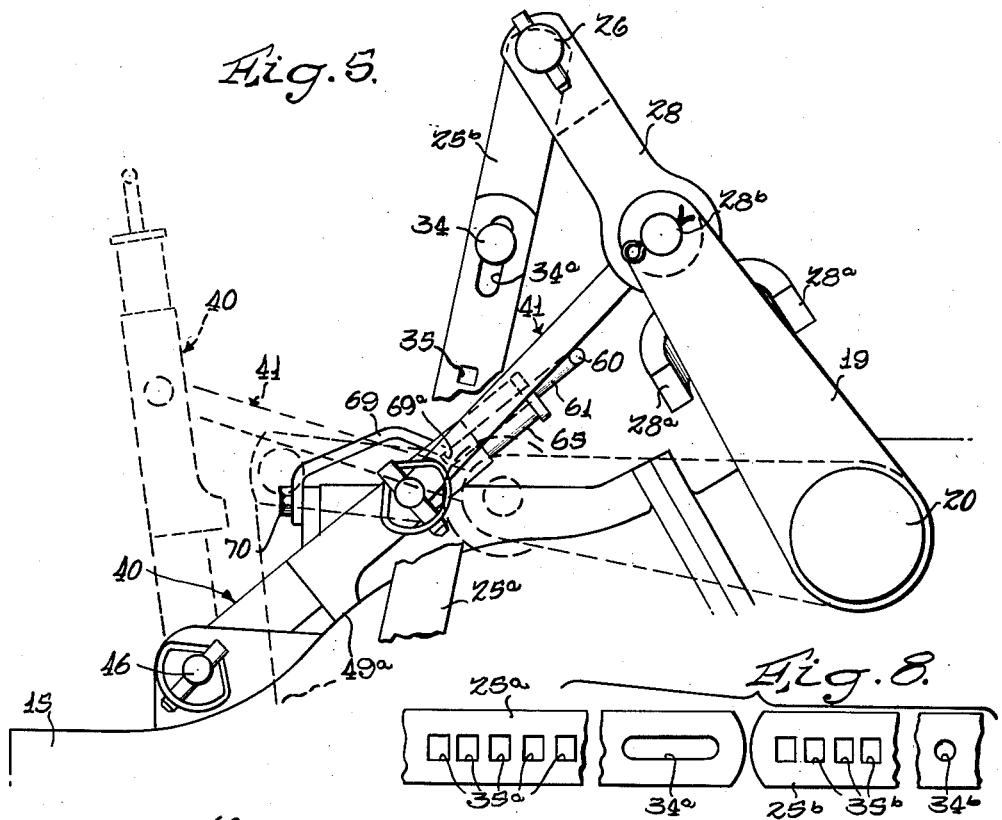
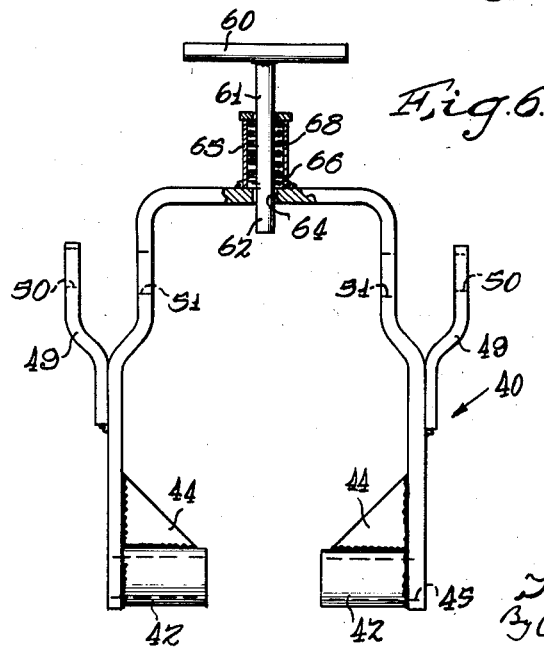
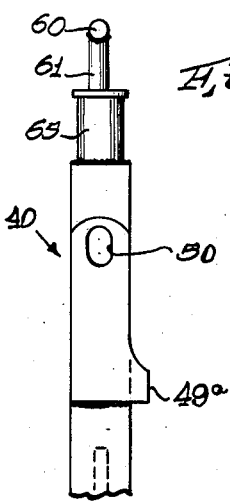
Inventor
James Curtis McNeice
By Carlson, Pitzner, Hubbard & Wolfe
Atty's

United States Patent Office 2,791,444
Patented May 7, 1957

2,791,444

HITCH ARRANGEMENT FOR TRACTORS OF THE CONNECTION FACILITATING TYPE

James Curtis McNeice, Lillington, Leamington Spa, England, assignor to The Massey-Harris Company, Racine, Wis., a corporation of Maryland Application June 28, 1954, Serial No. 439,845

Claims priority, application Great Britain July 3, 1953

2 Claims. (Cl. 280—479)

The present invention relates to power-actuated tractor hitches and, more particularly, to hitch arrangements in which a load-carrying coupling element may be locked in raised position so as to obviate the need for a sustaining action on the part of the power-actuator.

It is the general aim of the invention to provide a novel hitch arrangement in which a load-carrying hitch element is raised and lowered by the power-actuator commonly employed on many tractors, and in which a simple but reliable linkage is employed to mechanically lock the hitch element in its raised position, thereby relieving the power-actuator of the load and conserving energy.

Another object of the invention is to provide such an arrangement including a toggle linkage adapted to jack-knife freely in one direction from "dead center" thereby permitting the hitch linkage to be lowered, yet adapted so as to jackknife only a limited amount in the opposite direction to thereby mechanically lock the hitch linkage in its raised position.

It is a further object to provide a hitch arrangement for a tractor having a power system of the type which is automatically shut off when the lifting elements or arms reach a predetermined limit or "transport" position, the hitch being chracterized by novel and simplified means for preventing the lift arms from reaching "transport" position, whereby the power system may be readily employed for actuating auxiliary devices while the hitch is maintained in its raised position.

Other objects and advantages will become apparent as the following description proceeds, taken in conjunction with the accompanying drawings, in which:

Figs. 3 and 4 are similar to Figs. 1 and 2, respectively, illustrating the hitch arrangement in its raised and locked position;

Fig. 5 is an enlarged detail view of the toggle locking means, the latter being shown locked in full lines and unlocked in dashed lines;

Figs. 6 and 7 are detail front and side views, respectively, of the lower toggle link; and Fig. 8 is a fragmentary detail view of an adjustable lift link.

Figure 1:
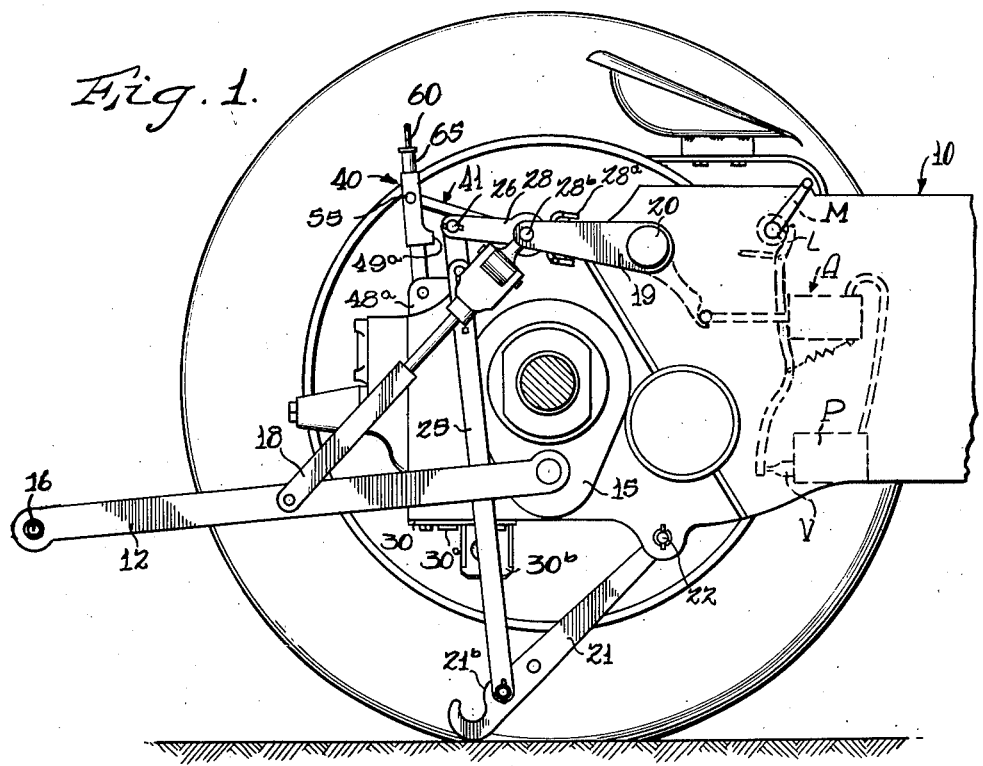
Figure 1 is a side elevation, partially broken away, of the rear portion of a tractor having a hitch arrangement embodying the features of the invention and shown in its lowered position.

While the invention has been shown and is described in some detail with reference to a particular embodiment thereof, there is no intention that it thus be limited to such detail. On the contrary, it is intended here to cover all modifications, alternatives, and equivalents falling within the spirit and scope of the invention as defined by the appended claims.

Referring now to the drawings, the novel hitch arrangement has here been illustrated as embodied in a trailer hitch which is employed with a tractor 10 (partially shown) of the type equipped with power-actuated system for raising and lowering hitch components. The power system and existing hitch components may be organized as shown and described in Ferguson U. S. Patent 2,118,180.

The external components of this now well-known "Ferguson" implement hitch and system include a pair of forwardly converging draft links 12 which are universally trailingly pivoted as at 14 to the underside of the tractor's rear center housing 15. Carried at the aft end of the draft links 12 are swiveled, apertured balls 16 adapted to receive coupling pins for mounting various implements (not shown). For raising and lowering the draft links 12, a pair of drop links 18 are pivotally connected between their midportions and the aft ends of a corresponding pair of lift arms 19 fast on a rock shaft 20 journaled in the rear portion of the tractor housing. The usual top control link, rocker, and main spring have been removed in the present case since the hitch here shown is to be used for towing or transporting trailers and the like, rather than for automatic draft control of ground-engaging implements.

The "Ferguson" system further includes a main hydraulic actuator A, a pressure fluid source or pump P driven by the tractor engine, a control valve V, and a manual control or quadrant lever M, the construction and organization of which will be familiar to those skilled in the art and acquainted with the aforementioned Ferguson patent. Briefly, the system is one in which pressure fluid supplied to the actuator A shifts a piston $A_1$ which in turn rocks the rock shaft 20 clockwise to elevate the rear ends of the lift arms 19. This, of course, also elevates the draft links 12. In order to effect such raising of the hitch components, the quadrant lever M is pulled up to the position illustrated, thereby shifting a lever L to open the control valve V. This opens the intake for the pump P so that fluid is supplied to the actuator. In order to automatically stop elevation of the lift arms 19 at a predetermined limit for "transport" position, the lever L is positioned to be engaged by the skirt of the piston $A_1$ as it emerges from its cylinder. This automatically neutralizes the control valve V and traps fluid in the main actuator A. With the control valve thus neutralized, additional pressure fluid is not obtainable from the pump P so that without some means to limit and prevent the lift arms 19 from reaching their "transport" position, auxiliary actuators could not be operated from the existing hydraulic hitch system.

The illustrated embodiment of the improvements constituting the present invention is shown as a trailer hitch of the general type described and claimed in the copending application of Theo Sherwen, Serial No. 63,404, filed December 3, 1948. This type of hitch is intended particularly to permit forwardly over-balanced vehicles, such as two-wheeled trailers, to be coupled and raised to horizontal position for towing by employing the power system, described above, already existing on many tractors.

Insofar as the present arrangement is similar to the Sherwen application, it includes a coupling element, here shown as a rearwardly extending trailer hook 21, pivotally connected to the underside of the tractor by a pin 22. Means are provided for connecting the hook 21 to swing in unison with the lift arms 19 and at the same time to both prevent the lift arms from reaching transport shut off position and to mechanically lock the hook 21 in raised position so as to relieve the load from the main hitch actuator. It is to improvements in these latter components that the present invention is directed.

In accordance with one feature of the invention, novel, directly connected means are provided between the hook 21 and the lift arms 19 so that the two are rocked in unison by the power actuator, yet so as to prevent the lift arms 19 from reaching their limit or "transport shut off" position. As explained previously, and more fully brought out in the above-mentioned Sherwen application, it is highly desirable to prevent the lift arms from reaching transport position in order that a supply of pressure fluid is available from the pump for energizing various auxiliary actuators.

As shown in this instance, the dual function described above is effected by a pair of lift links 25 which are pivotally interposed between the lift arms 19 and the hook 21. Connection at the lower end of the lift links 25 is effected by the insertion of pins or trunnions 21a, integral with the hook 21, into suitably located apertures in the lift links. Connection at the upper end of the lift links 25 is effected by pinned connections at 26 to extensions 28 fastened on the respective lift arms 19. These extensions 28 are of known construction, including a pair of tabs 28a embracing the lift arms at their midportions and a properly located aperture receiving the same pin 28b which connects the drop links 18 between the lift arms and the draft links 12.

For limiting the upward swing of the hook 21, and therefore the uppermost position of the lift arms 19, a pad 30 is bolted to the underside of the tractor and provided with a stop surface 30a located so as to be engaged by a cooperating stop projection 21b integral with the hook 21. As another feature, the pad 30 may be provided with spaced downwardly extending tabs 30b formed with alined apertures through which a pin 31 may be inserted to hold the hook up and out of the way when it is not being used.

The lift links 25 are made of proper length so that the projection 21b on the hook 21 is brought into abutting engagement with the stop surface 31 before the lift arms 19 reach transport shut off position. In order to permit precise adjustment of this limit position for the lift arms 19 notwithstanding manufacturing tolerances, the lift links 25 are constructed in a manner to be precisely adjusted in length. As here shown (Figs. 2, 5 and 8), each lift link 25 is made up of two sections 25a and 25b. A slidable connection between the two parts 25a and 25b is made by a bolt 34 passed through a slot 34a in the first section and through a mating hole 34b in the second section. By loosening the bolt 34, the two parts may be adjusted axially relative to one another. In order to lock the two parts together in accurately adjusted relation, they are provided with corresponding series of bolt-receiving holes 35a, 35b which are axially spaced according to a vernier relation. That is, different pairs of the holes become alined for the reception of a locking bolt 35 as the two sections 25a, 25b are moved axially with respect to one another, so that the hole 34b may be placed in any one of four closely spaced positions along the slot 34a.

In the use of a trailer hitch of the type illustrated, the hook 21 is raised, by the power actuator A acting through the lift arms 19, into coupled and supporting engagement with the tongue or other cooperating coupling member of a trailer or towed vehicle (not shown). In many instances, the hook 21 is left in its raised, coupled position for long periods of time. If the power actuator and lift arms were relied upon to hold the hook 21 and the weight of an over-balanced two-wheeled trailer in the raised position, the hydraulic pump P and control valve V in the hitch power system would have to maintain a continuous supply of pressure fluid; and pressure in the main actuator would increase to the point where blow-off through a high pressure relief valve (not shown) would result. Continued pumping through the high pressure relief valve causes aeration and heating of the fluid and consumes a substantial amount of power from the tractor engine. It is therefore highly desirable that once the trailer hook 21 is elevated, it be locked by mechanical means independent of the hitch power-actuating system.

In accordance with another feature of the invention, a simple and improved mechanical toggle linkage is used in conjunction with the trailer hitch to optionally lock the same in raised position. The toggle linkage includes two links 40 and 41 pivoted together at their adjacent ends and pivoted respectively to the lift arms 19 and the tractor housing. The toggle links are so arranged as to jackknife freely in a rearward direction to permit lowering of the lift arms and hook (Figs. 1 and 2), or to jackknife inwardly only to a limited degree.

As here shown, the toggle links 40, 41 are of double construction. The lowermost link 40 (Figs. 6 and 7), in the present instance is formed in the shape of an inverted U, there being inwardly extending bushings 42 secured in place by welded gussets 44 so as to register with openings 45 in the spaced arms of the U-shaped member. The bushings 42 are adapted to be received on a long pivot pin 46 which is inserted through an apertured central boss 48 flanked by apertured flanges 48a on the rear of the tractor. While various facilities may be employed for effecting pivotal connection of the lower end of the toggle link 40 to the tractor, this connection is particularly enhanced in the present case by the boss 48 and flanges 48a which are already present on tractors having a differential housing of the type shown and claimed in Bunting U. S. Patent 2,486,257, to which reference may be had for further details. For pivotal connection to the mating toggle link 41, the lower toggle link 40 is also provided with spaced straps 49 welded on either side which have elongated slot-like apertures 50 registered with similar apertures 51 in the U-shaped member.

The other toggle link 41 is formed in two parts 41a, 41b which are simply struts formed with angularly oriented apertured sleeves 41c on opposite ends (Fig. 4). The upper ends of the struts 41a, 41b are pivotally received on the pins 28b which, as explained previously, connect the drop links 18 to the lift arms 19 and also hold the extensions 28 in place on the lift arms 19. The lower ends of the struts 41a, 41b are interposed between the straps 49 and the U-shaped member of the link 40, being pivotally connected by the insertion of appropriate pins 55.

In order to assure that the toggle links 40, 41 may be easily passed through their "dead center" or axially alined position in locking and unlocking the hook 21 and arms 19, the apertures 50 and 51 which receive the pins 55 are made of slot-like shape and considerably longer than the diameter of the pins. Thus, there is a certain freedom of movement to permit folding of the toggle links 40, 41 even when the lift arms 19 have been raised to a position which places the toggle links in "dead center" or axially alined relation.

Figure 2:
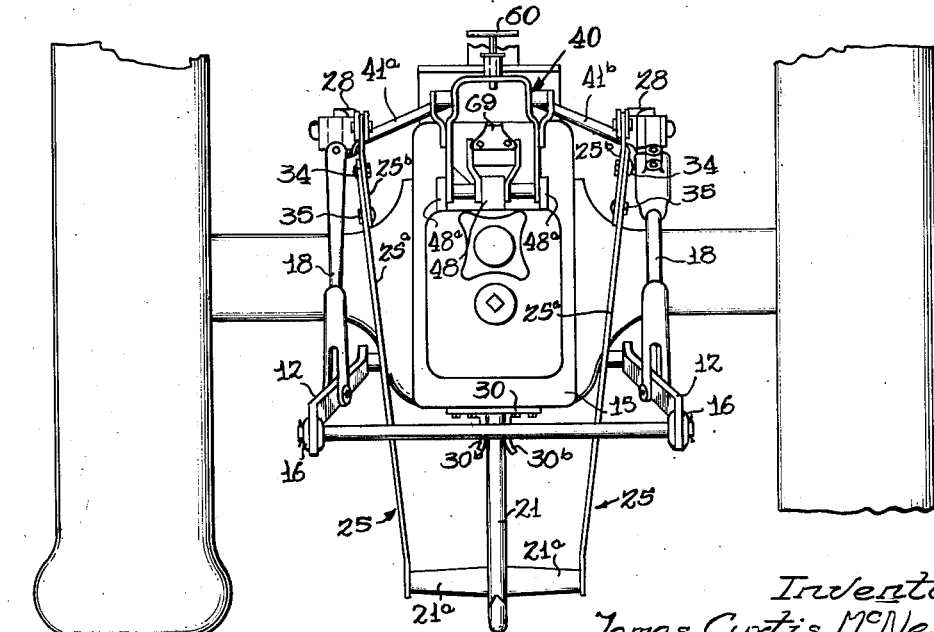
Fig. 2 is a rear elevation of the tractor and hitch arrangement in Fig. 1.

As contemplated in the preferred form of the invention, the lift links 25 are adjusted in length by means of the vernier-related holes 35a, 35b so that when the lift arms 19 reach the maximum elevation, as determined by abutment of the hook 21 against the pad stop 30a, the pins 55 will be approximately centered in the apertures 50, 51 and the toggle links 40, 41 alined in "dead center" relation. Thus, with the lift links subsequently lowered by causing fluid to be vented from the main actuator, the two toggle links 40, 41 fold inwardly toward the tractor under the influence of gravity. In the illustrated form this inward folding is limited, however, by the engagement of the stop surface 49a on the lower link 40 against the rear housing or body 15 of the tractor 10 (Figs. 1, 2, and 5). Since folding cannot proceed further, the lift arms 19 are mechanically locked in the raised position, causing the lift links 25 to hold the hitch hook 21 in its raised and load-carrying position. Pressure need not be maintained in the actuator A; it may be vented by shoving the quadrant lever M downwardly.

Whenever the operator desires to lower the trailer hook 21, he need only cause pressure fluid to be supplied to the actuator A (thus returning the lift links 19 to their maximum elevation and causing the toggle links 40, 41 to assume their "dead center" relation), pull rearwardly on the toggle links to initiate jackknifing in a rearward direction, and then cause venting of the hydraulic actuator A (by shoving down on the quadrant lever M) so that the lift arms 19 and the hook 21 are lowered under the influence of gravitational forces. The toggle link thus folds freely in a rearward direction as illustrated in Figs. 1 and 2.

As indicated above, the tractor operator must grasp one of the toggle links so as to flip the linkage rearwardly in order to permit unlocking and lowering of the trailer hook 21. It is desirable, therefore, that a suitable handle be provided which permits the operator to effect this action with a minimum of effort. Moreover, in the preferred form of the invention, the toggle linkage folds inwardly only a slight amount from "dead center" before locking, in this case by abutment of the stop 49a against the tractor housing, occurs. With the pin 55 and oversize slot 50, 51 connection between the two respective toggle links, which provides ease in shifting the linkage in either direction from "dead center," it might happen that as the tractor is driven over rough terrain the jarring and bouncing might cause the toggle linkage to fold rearwardly and accidentally unlock the hitch arrangement.

In accordance with still another feature of the invention, a combined handle and positive latching arrangement is provided for the toggle linkage. A very simple spring biased handle and latch construction performs the dual function of (1) permitting the operator to easily take hold of the toggle linkage and flip it in a rearward direction, and (2) preventing accidental "bounce-out" of the toggle linkage from its locked position.

As shown in the present instance in Fig. 6, such an arrangement is provided by a handle 60 including a stem 61 having an extension 62 which projects through a hole 64 in the top of the toggle link 40. The handle 60 is mounted on the toggle 40 in a manner such that the extension 62 is biased inwardly. As here illustrated, a cylindrical housing 65 is welded or otherwise suitably attached to the bridge of the U-shaped toggle link 40, the stem 61 passing therethrough and carrying an annular flange 66 acted upon by a compression spring 68 disposed within the housing 65.

For cooperating with the inwardly biased extension 62, a latch plate 69 (Fig. 5) is secured to the rear of the tractor as by bolts 70 which are inserted into existing tapped openings in the tractor housing normally used to mount an apertured plate through which the draft control plunger passes and against which the draft control spring (not shown) abuts. The latch plate 60 extends upwardly and forwardly over the tractor housing to present its forward edge 69a at a proper location to engage the extension 62 and prevent rearward swing of the toggle link 40. Thus, when the toggle links 40, 41 drop into their locking position (Fig. 5) the extension 62 snaps behind the edge 69a of the latch plate 69 to retain the toggle linkage in its locked position. To lower the trailer hook 21, the operator need only grasp the handle 60 and pull upwardly on the same to free the extension 62 from the plate 69. A rearward pull on the handle 60 then swings the toggle linkage rearwardly so that the hitch arrangement may be lowered as shown in Fig. 1.

*Résumé of operation*

It is believed that from the foregoing the operation of the present hitch arrangement will be clear. However, a brief summary may be helpful. In order to engage the trailer hook 21 with the cooperating tongue of a trailed vehicle (not shown), the hook is lowered as shown in Figs. 1 and 2 and the tractor backed until the hook underlies the trailer tongue. The tractor operator may then cause the power system of the tractor to rock the lift arms 19 counterclockwise, the lift links 25 swinging the hook 21 upwardly so that it engages the tongue and lifts the same. When the projection 21b abuts the stop surface 30a on the underside of the tractor, movement of the lift arms 19 is terminated. This limit position of the arms 19 may be accurately adjusted by means of the sliding connection 34, 34a, 34b and vernier holes 35a, 35b provided in the cooperating sections 25a, 25b of the lift links 25. The length adjustment of the links is preferably such that the two toggle links 40, 41 are in alined or "dead center" relation at this time, with the pins 55 connecting the same disposed centrally in the oversize slots 50, 51. Thus, when the operator vents the hitch actuator A, by lowering the quadrant lever M, the lift arms 19 drop a slight amount and the toggle links 40, 41 fold inwardly through a slight angle until the stop 49a on the link 40 abuts the tractor housing 15. At the same time, the extension 62 rides into locking engagement with the forward edge 69a of the latch plate 69. The arms 19 and trailer hook 21 are thus locked in their raised positions by the toggle links 40, 41 and the latter are prevented from bouncing out of such locking position by latching of the extension 62 behind the plate 69.

The power system for the tractor hitch, in the present case described as being hydraulic, is thus completely relieved of the function of sustaining the trailer hook 21 in elevated position. Furthermore, it will be understood that the draft links 12 are also raised and lowered in response to rocking of the lift arms 19 and that in those cases where an implement is carried on the draft links simply for transport purposes and not for draft control operation, the toggle links 40, 41 may be similarly employed to relieve the power system of a sustaining action, that is, holding a heavy implement in raised position as it is carried from one location to another. In all cases the lift arms are prevented from reaching "transport shut off" position by the abutment of the hook 21 against the pad 30 on the underside of the tractor. Therefore, pressure fluid may be supplied to and vented from the actuator A as desired by raising and lowering the quadrant lever M, so that auxiliary actuators employed for various purposes in connection with accessories on the tractor or the trailed vehicle may be properly operated. Once the trailer hook 21 has been locked in its raised position and additional pressure fluid is not needed for auxiliary actuators, the quadrant lever M may be shifted downwardly to vent the actuator A. Continued pumping through the high pressure relief valve (not shown) of the system is thus precluded.

When it is desired to lower the hook 21 and uncouple the trailed vehicle, the operator merely pulls upwardly on the handle 60 to withdraw the extension 62 from engagement with the latch plate 69. Then, by causing the power system to rock the lift arms 19 upwardly a slight amount, and by pulling rearwardly on the handle 60, the toggle links 40, 41 are folded rearwardly as shown in Figs. 1 and 2 so that the hook 21 and draft links 12 are lowered under the influence of gravity when the main system actuator is vented.

I claim:

1. For use on a tractor having a pair of rearwardly extending lift arms on its rear housing and power means for swinging the arms upwardly; a hitch arrangement comprising, in combination, a coupling element pivoted to the tractor rear housing beneath the lift arms; means connecting said hitch element to swing in unison with the lift arms; a toggle linkage including a U-shaped link having its arms pivoted to the tractor rear housing, a pair of cooperating links pivoted to the ends of the respective lift arms and to said U-shaped link, and stop means on said U-shaped link adapted to abut the tractor rear housing when said toggle linkage folds inwardly from "dead center" to thereby lock said hitch element in raised position; a latch plate attachable to the tractor housing; a handle mounted on the bridge of said U-shaped link and having a spring-biased extension engageable behind said plate to lock said toggle linkage in its inwardly folded position.

2. For use on a tractor having a pair of lift arms on its rear housing and power means for raising the lift arms, a trailer hitch comprising, in combination, a rearwardly extending trailer-coupling hook pivoted at its forward end to the underside of the tractor's rear housing, a pair of lift links connected between respective ones of the lift arms and said hook to swing the latter in unison with the former, each of said lift links including two joined sections formed with a series of holes spaced axially in vernier relation to afford precise adjustment of the link's length, first and second toggle links pivotally joined by a pin and slot connection and pivotally connected at their remote ends respectively to the lift arms and the tractor housing, said toggle links being adapted to jackknife freely in a rearward direction from "dead center" to permit lowering of the lift arms and said hook, stop means on one of said toggle links for abutting the tractor housing and limiting inward jackknifing to thereby lock said hook in raised position, said lift links being adjustable in length to cause abutment of said hook against the tractor housing to terminate elevation of the lift arms when said toggle links are in "dead center" relation, a handle slidably mounted on one of said toggle links and having a latch extension, spring means for yieldably biasing said handle in one direction relative to said one link, and a latch plate on the tractor housing coacting with said extension to releasably retain said toggle links in the inwardly jackknifed position.

References Cited in the file of this patent

UNITED STATES PATENTS

| | | |
|---|---|---|
| 2,440,422 | Westmoreland | Apr. 27, 1948 |
| 2,465,641 | Gardner | Mar. 29, 1949 |
| 2,570,141 | McKee | Oct. 2, 1951 |

FOREIGN PATENTS

| | | |
|---|---|---|
| 552,660 | Great Britain | Apr. 19, 1943 |
| 599,105 | Great Britain | Mar. 4, 1948 |
| 659,177 | Great Britain | Oct. 17, 1951 |
| 665,827 | Great Britain | Jan. 30, 1952 |